(12) United States Patent
Chen et al.

(10) Patent No.: US 11,538,501 B2
(45) Date of Patent: Dec. 27, 2022

(54) METHOD FOR GENERATING VIDEO, AND ELECTRONIC DEVICE AND READABLE STORAGE MEDIUM THEREOF

(71) Applicant: BEIJING DAJIA INTERNET INFORMATION TECHNOLOGY CO., LTD., Beijing (CN)

(72) Inventors: Tiejun Chen, Beijing (CN); Hao Yang, Beijing (CN)

(73) Assignee: BEIJING DAJIA INTERNET INFORMATION TECHNOIOEY CO., LTD, Beijing (CN)

( * ) Notice: Subject to any disclaimer, the term of this patent is extended or adjusted under 35 U.S.C. 154(b) by 0 days.

(21) Appl. No.: 17/035,445

(22) Filed: Sep. 28, 2020

(65) Prior Publication Data

US 2021/0098022 A1    Apr. 1, 2021

(30) Foreign Application Priority Data

Sep. 29, 2019  (CN) .......................... 201910932707.9

(51) Int. Cl.
| | |
|---|---|
| *G11B 27/00* | (2006.01) |
| *H04N 5/93* | (2006.01) |
| *G11B 27/10* | (2006.01) |
| *G11B 27/036* | (2006.01) |
| *H04N 9/80* | (2006.01) |

(52) U.S. Cl.
CPC ............ *G11B 27/036* (2013.01); *G11B 27/10* (2013.01)

(58) Field of Classification Search
USPC ................. 386/280, 278, 287, 282, 241, 239
See application file for complete search history.

(56) References Cited

U.S. PATENT DOCUMENTS

| | | | |
|---|---|---|---|
| 2004/0095474 A1 | 5/2004 | Matsufune | |
| 2008/0071831 A1* | 3/2008 | Reddy | .................... G06F 16/907 |
| 2012/0284625 A1* | 11/2012 | Kalish | .................. G11B 27/034 |
| | | | 715/723 |
| 2014/0112534 A1* | 4/2014 | Sako | .................... G06F 21/6245 |
| | | | 382/103 |

(Continued)

FOREIGN PATENT DOCUMENTS

| | | |
|---|---|---|
| CN | 104780439 A | 7/2015 |
| CN | 106572395 A | 4/2017 |

(Continued)

OTHER PUBLICATIONS

First Office Action of Chinese Patent Application No. 201910932707.9—17 pages (dated May 8, 2021).

*Primary Examiner* — Daquan Zhao
(74) *Attorney, Agent, or Firm* — Knobbe, Martens, Olson & Bear, LLP (57) ABSTRACT

A method for generating a video can include: acquiring a profile of a video template, the profile being configured to describe one or more reference materials of the video template and an animated special effect corresponding to each of the one or more reference materials; acquiring the one or more reference materials based on the profile; acquiring a target material; acquiring at least one replaced reference material by replacing at least one of the one or more reference materials with the target material; and generating a target video with the animated special effect by rendering the one or more replaced reference material based on the profile.

16 Claims, 4 Drawing Sheets

(56) References Cited

U.S. PATENT DOCUMENTS

2015/0318020 A1* 11/2015 Pribula ................ H04N 9/8205
  386/227
2017/0062009 A1* 3/2017 Clifton ............... G06K 9/00765

FOREIGN PATENT DOCUMENTS

| CN | 109168028 A | 1/2019 | |
|---|---|---|---|
| CN | 109389429 A | 2/2019 | |
| CN | 110276057 A | 9/2019 | |
| WO | WO-2019123213 A1 * | 6/2019 | ............. G06F 9/451 |

* cited by examiner

METHOD FOR GENERATING VIDEO, AND ELECTRONIC DEVICE AND READABLE STORAGE MEDIUM THEREOF

CROSS-REFERENCE TO RELATED APPLICATIONS

This application claims priority under 35 U.S.C. 119 to Chinese patent application No. 201910932707.9, filed on Sep. 29, 2019, in the China National Intellectual Property Administration, the disclosure of which is herein incorporated by reference in its entirety.

TECHNICAL FIELD

The present disclosure relates to the field of multimedia technologies, and in particular, relates to a method for generating a video, and an electronic device and a readable storage medium thereof.

BACKGROUND

With the development of multimedia technologies, more and more people record their lives by making videos. In the making process, animation and special effects are often added to original images or video materials, such that the produced videos are aesthetic to some extent.

However, due to relatively complicated operation procedures required for adding animation and special effects, it is difficult for users to make videos.

SUMMARY

The present disclosure provides a method for generating a video, and an electronic device and a readable storage medium thereof. The present disclosure also provides a method for generating a video to simplify the production process and to improve the user experience. The disclosed technical solutions are as below.

In one aspect, embodiments of the present disclosure provide a method for generating a video. The method includes:

acquiring a profile of a video template, the profile being configured to describe one or more reference materials of the video template and an animated special effect corresponding to each of the one or more reference materials;

acquiring the one or more reference materials based on the profile;

acquiring a target material;

acquiring at least one replaced reference material by replacing at least one of the one or more reference materials with the target material; and generating a target video with the animated special effect by rendering the replaced reference material based on the profile.

In another aspect, embodiments of the present disclosure provide an electronic device. The electronic device includes a processor and a memory configured to store at least one instruction executable by the processor, wherein the processor is configured to load and execute the at least one instruction stored in the memory to perform the steps of:

acquiring a profile of a video template, the profile being configured to describe one or more reference materials of the video template and an animated special effect corresponding to each of the one or more reference materials;

acquiring the one or more reference materials based on the profile;

acquiring a target material;

acquiring at least one replaced reference material by replacing at least one of the one or more reference materials with the target material; and generating a target video with the animated special effect by rendering the replaced reference material based on the profile.

In another aspect, embodiments of the present disclosure provide a storage medium storing at least one instruction therein, wherein the at least one instruction, when executed by a processor of an electronic device, enables the electronic device to perform the steps of:

acquiring a profile of a video template, the profile being configured to describe one or more reference materials of the video template and an animated special effect corresponding to each of the one or more reference materials;

acquiring the one or more reference materials based on the profile;

acquiring a target material;

acquiring at least one replaced reference material by replacing at least one of the one or more reference materials with the target material; and generating a target video with the animated special effect by rendering the replaced reference material based on the profile.

BRIEF DESCRIPTION OF DRAWINGS

The accompanying drawings, which are incorporated in and constitute part of this description, illustrate embodiments consistent with the present disclosure and, together with the description, serve to explain the principles of the present disclosure and do not constitute an improper limitation to the present disclosure.

DESCRIPTION OF EMBODIMENTS

The technical solutions of the embodiments of the present disclosure will be described clearly and completely with reference to the accompanying drawings, to enable those of ordinary skills in the art to better understand the technical solutions of the present disclosure.

It should be noted that the terms "first" and "second" in the description and claims of the present disclosure and the above-mentioned drawings are used to distinguish similar objects, and are not necessarily used to describe a specific sequence or precedence order. It should be understood that the data used in this way can be interchanged under appropriate circumstances such that the embodiments of the present disclosure described herein can be implemented in a sequence other than those illustrated or described herein. The implementations described in the following example embodiments do not represent all implementations consistent with the present disclosure. In contrast, they are merely examples of devices and methods consistent with some aspects of the present disclosure as detailed in the appended claims.

Figure 1:
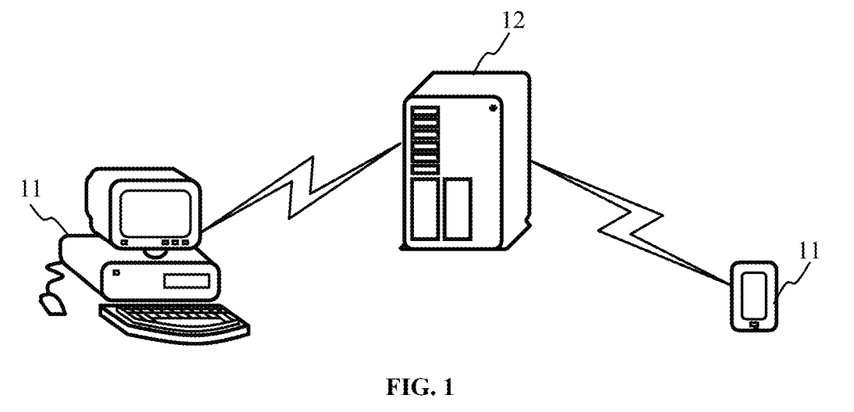
FIG. 1 is a schematic diagram showing an implementation environment of a method for generating a video according to an example embodiment.

An embodiment of the present disclosure provides a method for generating a video applicable to an implementation environment shown in FIG. 1. FIG. 1 includes one or more clients 11 and a server 12, wherein the client 11 is in communication connection with the server 12 to acquire a profile of a video template from the server 12.

The client 11 is installed in an electronic device. In some embodiments, the electronic device is any electronic product that can perform human-computer interaction with a user by one or more means including a keyboard, a touch pad, a touch screen, a remote controller, a voice interaction device and a handwriting device, and the electronic product may be such as a personal computer (PC), a mobile phone, a smart phone, a personal digital assistant (PDA), a wearable device, a pocket PC (PPC), a tablet computer, a smart car machine, or a smart TV.

In some embodiments, the server 12 is a server, or a server cluster composed of a plurality of servers, or a cloud computing service center.

Those skilled in the art should understand that the above-mentioned electronic devices and servers are merely examples, and other existing electronic devices or servers or those possibly emerging in the future that are applicable to the present disclosure should also be included in the scope of protection of the present disclosure, and are hereby included by reference.

Figure 2:
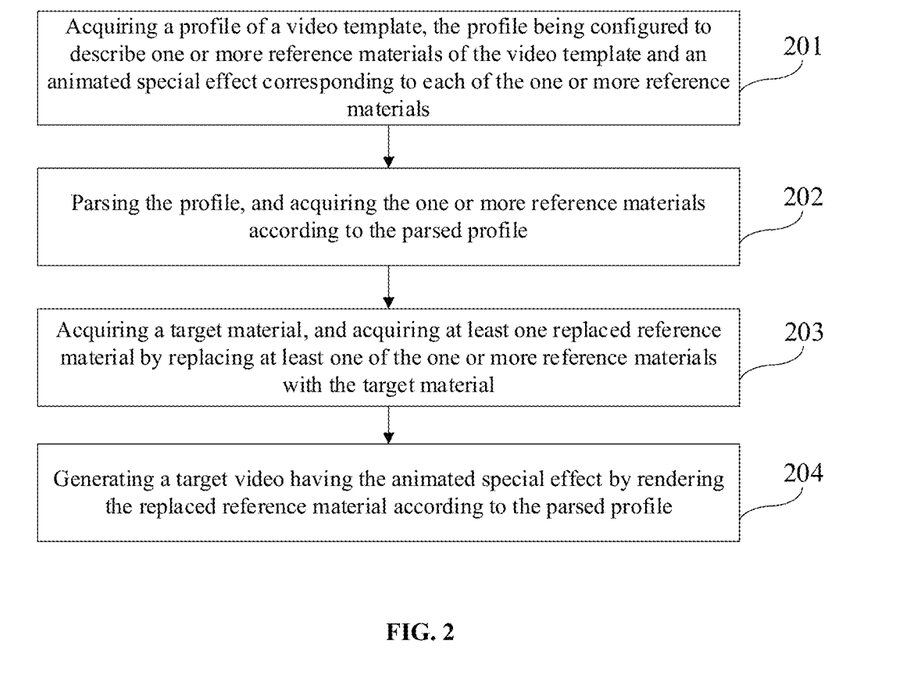
FIG. 2 is a flowchart of a method for generating a video according to an example embodiment.

FIG. 2 is a flow diagram of a method for generating a video according to an example embodiment. As shown in FIG. 2, the method is applicable to the client 11 shown in FIG. 1, and includes the following steps.

In step S201, a profile of a video template is acquired. The profile is configured to describe one or more reference materials of the video template and an animated special effect corresponding to each of the one or more reference materials.

The reference material includes, but not limited to, an image, a video and a pattern composed of one or more graphics, such as a pattern composed of such graphics as a square. Different reference materials are juxtaposed or overlapping with each other to form the video template. For any reference material included in the video template, the animated special effect corresponding to the reference material is one or two of an animation or a special effect, or the reference material does not achieve the animation or the special effect. In some embodiments, the animation includes but is not limited to transformation processes such as shift, rotation and scaling of the reference material, and the special effect includes blurred, clear, and fluctuated display effects of the reference material.

For example, taking the case where a first reference material is a black image and does not have an animation or a special effect, and a second reference material is a square, and has a "left to right" animation and a "blurred" special effect as an example, a video template formed by overlapping the first reference material and the second reference material includes: the square shifts from left to right under a black background and is gradually blurred during shifting.

Further, since the reference material includes an image, a video and a pattern composed of one or more graphics, each of the one or more reference materials is described by code data or a path in the profile. The code data is intended to describe the pattern composed of one or more graphics included in the reference material, and the path is intended to describe addresses of the image and the video included in the reference material. The animated special effect corresponding to the reference material is described by the code data. In the profile, the code data or the path used for describing the reference material is stored corresponding to the code data used for describing the animated special effect of the reference material.

Regarding a method of triggering acquisition of the profile, in some embodiments, one or more video templates are first displayed in the form of a video, a Graphics Interchange Format (GIF), or the like in the client, such that the user may select from the displayed video templates. If it is detected that any video template is selected, a request for acquiring the profile of the selected video template is sent by the server, and the server returns the profile stored locally in the server to the client based on the request, achieving acquisition of the profile. Alternatively, the server carries the profile stored locally in the server into an installation package of the client. In response to that the electronic device downloads the installation package of the client from the server, the electronic device may store the profile in the installation package. Therefore, the client directly calls the stored profile to achieve acquisition of the profile.

It should be noted that the profile stored locally in the server is uploaded by the electronic device used by a designer. In some embodiments, the electronic device acquires the video template designed by the designer, then calls a plug-in, and exports the video template as the profile by the plug-in.

The electronic device acquires the video template in the following way: acquiring the uploaded reference material, and adding the animated special effect by reference software based on the reference material. In this embodiment, the reference software includes Adobe After Effects (AE), where Adobe is the name of a software vendor, and AE has a built-in animation special effect. Therefore, importing the uploaded reference material into AE enables adding of the animated special effect based on the material. In addition to adding the built-in animated special effect of AE based on the material, in some embodiments, a custom animated special effect provided by an AE-based special-effect plug-in is added to the material, such that the material corresponds to relatively richer animated special effects, and further, the video template is high in attractiveness. In some embodiments, the special-effect plug-in is developed based on a software development kit (SDK) of AE.

After acquiring the video template, the electronic device further calls a plug-in to export the video template as a profile, and the plug-in is a plug-in that matches the software generating the video template. For example, the plug-in is bodymovin when the software is AE. It should be noted that in the process of calling bodymovin to export the video template as the profile, due to attribute restriction of bodymovin, the profile exported by bodymovin may describe only the reference material included in the video template and the animation corresponding to the reference material but not the special effect corresponding to the reference material. Therefore, in this embodiment, a source code of bodymovin is revised, and the revised bodymovin is used as the plug-in. The profile exported by the revised bodymovin may describe not only the reference material included in the video template but also the animated special effect corresponding to the reference material.

In this embodiment, the method of acquiring the profile is not defined. No matter which method is employed to acquire the profile, the reference material is further acquired based on the profile after acquisition. For details, reference may be made to step S202.

In step S202, the one or more reference materials are acquired based on the profile.

According to the description in step S201, it can be known that the profile describes one or more reference materials included in the video template. Therefore, by reading the code data and the path in the profile, one or more reference materials included in the video template may be restored based on the code data and the path to acquire the reference material.

In some embodiments, the restored reference materials are displayed in a client interface, for example, in the order in which the reference materials appear in the video template. In addition, for each displayed reference material, the name of the animated special effect corresponding to the reference material may also be correspondingly displayed. For example, a reference material of a square is displayed in the client interface, and the words "shift from left to right" and "blurred" are displayed to hint the animation effect corresponding to the square. This display method is convenient for the user to select the reference material so as to replace the selected reference material. For details, reference may be made to step S203.

In step S203, a target material is acquired, and at least one replaced reference material is acquired by replacing at least one of the one or more reference materials with the target material.

The target material is an image or a video collected by the user via such a collection device as a camera, or a pattern designed by the user based on personal preferences. Therefore, during the replacement, the user may replace the reference material included in the video template with the user's own target material to meet the user's personalized needs.

In some embodiments, each of the one or more reference materials has a material identifier, and replacing at least one of the one or more reference materials with the target material to obtain the replaced reference material includes: displaying one or more reference materials; and in response to detecting that any reference material is selected, replacing the selected reference material with the target material to obtain the replaced material based on the material identifier of the selected reference material. The number of the selected reference materials is one or more.

The material identifier of the reference material is intended to distinguish different reference materials. In some embodiments, an interface is provided based on the material identifier of the selected reference material, and corresponding relationships between the reference material, the material identifier and the interface are stored. In response to detecting that any reference material is selected, the interface is determined based on the corresponding relationships, the target material is acquired via the interface, and the selected reference material is replaced with the target material to perform the replacement. In some embodiments, when a skip is made by the interface to an acquisition interface that has texts for prompting the user to upload the material, the material acquired via the acquisition interface is used as the target material to perform the process of acquiring the target material via the interface.

In some embodiments, after the target material is acquired via the interface, the acquisition interface may further display a re-upload button, a continue-to-upload button, and an upload completion button. In response to detecting that the re-upload button is selected, the target material acquired the interface is ignored, the material uploaded by the user is re-acquired via the interface, and the re-acquired material is still intended to replace the reference material selected by the user. In response to detecting that the continue-to-upload button is selected, the acquired target material is replaced with the reference material selected by the user, and then the user is prompted to continue to select the reference material to be replaced, and to upload the reference material for replacing the reference material to be replaced. In response to detecting that the upload completion button is selected, the user is no longer prompted to select the reference material or to upload the target material, and step S204 may be entered after the acquired target material is replaced with the selected reference material.

One or more replaced reference materials are obtained after the replacement. In addition to the target material, the one or more replaced reference materials may also include the reference material in the video template, which is not replaced by the target material. After one or more replaced reference materials are obtained, the one or more replaced materials are further rendered based on the profile. For details, reference may be made to step S204.

In step S204, a target video with the animated special effect is generated rendering the replaced reference material based on the profile.

In this embodiment, although the reference material included in the video template is replaced to obtain the one or more replaced reference materials, the animated special effect corresponding to the replaced reference material is still consistent with the animated special effect corresponding to the reference material not replaced. For example, the animated special effect corresponding to the first reference material in the video template is blurred, and if the first reference material is replaced with the target material, the animated special effect corresponding to the target material is still blurred. Therefore, the replaced reference material is rendered based on the profile to restore the animated special effect described by the profile on the replaced reference material, i.e., a target video having an animated special effect is generated.

It can be seen that a target video having an animated special effect is generated based on a target material uploaded by a user. The user only needs to upload a target material to obtain the target video with the animated special effect, without the need to add the animated special effect manually. Therefore, the operation procedure is simplified, the difficulty of making videos is lowered, the user's passion in making videos is increased, and the user experience is enhanced.

In some embodiments, before rendering the replaced reference material based on the profile, the method according to this embodiment further includes: acquiring a predetermined display duration of each of the at least one replaced reference material. Accordingly, generating the target video with the animated special effect by rendering the replaced reference material based on the profile includes: generating the target video with the animated special effect by rendering the replaced reference material based on the profile and the display duration of each of the at least one replaced reference material, wherein any of the at least one replaced reference material in the target video is displayed based on the display duration of the any replaced reference material.

In some embodiments, a default display duration of the reference material in the video template is displayed in the client interface, the displayed default display duration is predetermined as a modifiable item, and options or input boxes are provided for the user such that convenience is brought for the user to adjust the default display duration via the options or the input boxes based on personal preferences. Therefore, the selected or input display duration is taken as the acquired predetermined display duration of each of the at least one replaced reference material.

Alternatively, a timeline is displayed on the client interface, the display duration of each of the at least one replaced reference material is reflected by labeling objects on the timeline, and the labeling objects include line segments of different colors, shadows, and the like. The user adjusts the display duration of the replaced reference material by dragging boundaries of the labeling objects, and then takes the dragged boundaries of the labeling object as the predetermined display duration of each of the at least one replaced reference material. Taking the case where the labeling objects are line segments as an example, left and right end points of the line segments dragged by the user are used as the predetermined display duration. The longer the line segments are, the longer the display duration of the replaced reference material is. This acquisition method is relatively intuitive to the user and is better in user experience.

Further, the labeling accuracy of the labeling objects is adjusted based on user's settings or gestures. For example, if the default labeling accuracy of the labeling objects is 5 seconds, the user drags the labeling objects to adjust the display duration in units of 5 seconds. Taking the case where the gesture includes long-pressing the boundary of the labeling object and keeping still as an example, if it is detected that the boundary of the labeling object is selected and kept still, the labeling accuracy may be automatically improved from 5 seconds to 1 second, and the labeling object adjusted by the user in the way of dragging may adjust the display duration in units of 1 second.

No matter how the predetermined display duration is acquired, the animated special effect is added to the replaced reference material with the predetermined display duration based on the profile after the predetermined display duration is acquired so as to obtain the target video that satisfies the user's personal preferences. In the target video, any replaced reference material is displayed based on the display duration of the any replaced reference material. For example, if the display duration of one replaced reference material is 5 seconds, a time difference between display time and hiding time of the replaced reference material in the target video is 5 seconds, i.e., the replaced reference material is displayed for 5 seconds.

In some embodiments, rendering the replaced reference material based on the profile includes: rendering the replaced reference material in a reference order based on the profile.

Figure 3:
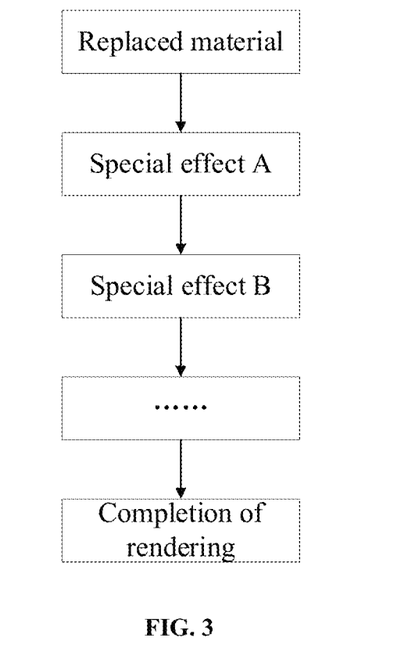
FIG. 3 is a schematic diagram of a rendering process according to an example embodiment.

Any of the at least one replaced reference material is rendered based on a chain process shown in FIG. 3. That is, the replaced reference material is used as an input, and one animation or one special effect is restored on the replaced reference material based on the profile to acquire a reference material that is rendered once. After that, if there are other animations or special effects that need to be restored, the reference material that is rendered once is taken as an input, one animation or one special effect is continuously restored on the reference material that is rendered once to acquire a reference material that is rendered twice, and so on until restoration of all animations or special effects is completed. Thus, rendering of the replaced reference materials is completed.

Regarding determination of the reference order, in some embodiments, each of the at least one replaced reference material corresponds to one time point in the timeline of the video template. Before rendering one or more replaced reference materials in the reference order, the method also includes: determining a reference order based on the sequence of time points. For example, all the replaced reference materials are rendered sequentially in the order of increasing time points.

Figure 4:
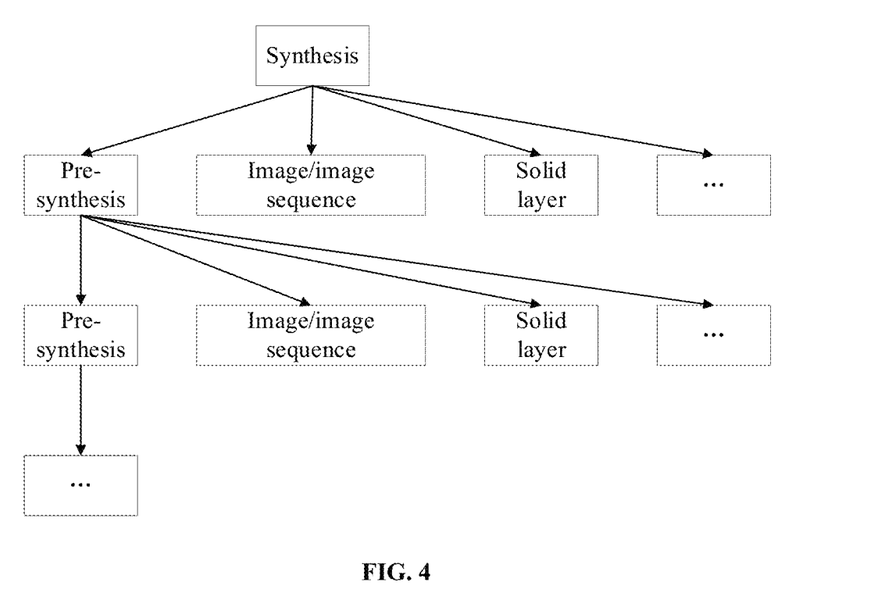
FIG. 4 is a schematic structural diagram of synthesis according to an example embodiment.

It should be noted that for the video template generated by AE and the AE-based special-effect plug-in, the video template is called "synthesis", and the synthesis has a timeline, so the reference materials included in the video template have corresponding time points. Correspondingly, the replaced reference materials also have corresponding time points. In addition, as shown in FIG. 4, the material included in the video template is divided into different types such as pre-synthesis, a solid layer, an image, an image sequence, an empty material, and an adjustment layer. Pre-synthesis further includes other materials of pre-synthesis, images, image sequences, and the like. That is, the materials included in the video template form a tree structure. The synthesis and the pre-synthesis also include attribute information of the video, such as width, height, frame rate and duration of the video, which are intended to define sizes of the reference materials.

Further, the process of rendering the replaced material based on the profile needs to be performed by editing codes. In the related art, different platforms need to edit different codes. For example, an IOS/MAC platform edits codes based on core graphics, an Android platform edits codes based on Canvas, and a WEB platform edits codes based on scalable vector graphics (SVG), Canvas and Hypertext Markup Language (HTML). That is, in the related art, rendering is performed in different ways on different platforms, which leads to a higher rendering cost. Besides, different platforms have much different rendering effects, and stuttering may occur.

In some embodiments, rendering the replaced reference material in the reference order based on the profile includes: calling an open graphics library based on the profile, the open graphics library including a plurality of reference functions; and calling a reference function provided by the open graphics library in the reference order, and executing the called reference function.

Open Graphics Library (OpenGL) is a cross-platform application programming interface (API), and provides a plurality of reference functions, and different platforms may edit codes by calling the functions provided by OpenGL. After that, by executing the reference functions in the codes, an animation and a special effect may be restored on the replaced reference material. Therefore, in this embodiment, rendering is performed in the same manner on different platforms, such that the rendering cost is low, different platforms have less different rending effect, and only small differences in rendering speed may be caused due to different configurations of the electronic device.

In addition, according to the description in step S201, it can be known that the animated special effect corresponding to the replaced reference material may be a custom animated special effect provided by a special-effect plug-in other than AE. Therefore, in addition to rendering by OpenGL, the special-effect plug-in is also called for rendering. In the process of editing the codes to restore the animation or the special effect, not only the reference function provided by OpenGL but also the special-effect plug-in of direct AE may be called to restore the animated special effect on the replaced reference material, which further simplifies the process of editing the codes based on the profile and improves the rendering efficiency.

In this embodiment, after the target video with the animated special effect is generated, the target video will be displayed on the client interface for the user to preview. If it is detected that the user does not confirm the target video, the process returns to the steps of acquiring the target material and the like, such that the user may re-adjust the target video. Correspondingly, if it is detected that the user confirms the target video, the target video confirmed by the user is further output, such that the user may export the target video from the client to complete making of the target video.

In summary, in the embodiment of the present disclosure, a reference material is acquired based on the profile, and the reference material is replaced with a target material uploaded by a user. An animated special effect is recovered from the replaced reference material based on the profile, such that a target video is obtained. It can be seen that in the present disclosure, a target video having an animated special effect is generated based on a target material uploaded by a user. The user only needs to upload a target material to obtain the target video with the animated special effect, without the need to add the animated special effect manually. Therefore, the operation procedure is simplified, the difficulty of making videos is lowered, the user's passion in making videos is increased, and the user experience is enhanced.

Figure 5:
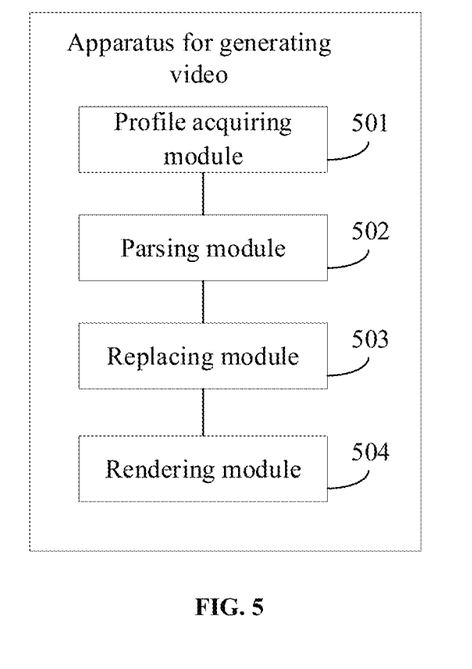
FIG. 5 is a schematic structural diagram of an apparatus for generating a video according to an example embodiment.

FIG. 5 is a block diagram of an apparatus for generating a video according to an example embodiment. Referring to FIG. 5, the apparatus includes a profile acquiring module 501, a parsing module 502, a replacing module 503, and a rendering module 504.

The profile acquiring module 501 is configured to acquire a profile of a video template, wherein the profile is configured to describe one or more reference materials of the video template and an animated special effect corresponding to each of the one or more reference material.

The parsing module 502 is configured to acquire the one or more reference materials based on the profile.

The replacing module 503 is configured to acquire a target material and acquire at least one replaced reference material by replacing at least one of the one or more reference materials with the target material.

The rendering module 504 is configured to generate a target video having the aminated special effect by rendering the replaced reference material based on the profile.

In some embodiments, the device further includes a display duration acquiring module configured to acquire a predetermined display duration of each of the at least one replaced reference material.

The rendering module 504 is configured to generate the target video with the animated special effect by rendering the replaced reference material based on the profile and the display duration of each of the at least one replaced reference material, wherein any of the at least one replaced reference material in the target video is displayed based on the display duration of the any replaced reference material.

In some embodiments, the rendering module 504 is configured to render the replaced reference material in a reference order based on the profile.

In some embodiments, each of the at least one replaced reference material corresponds to a time point in a timeline of the video template, and the apparatus further includes a determining module configured to determine the reference order based on an order of time points.

In some embodiments, the rendering module 504 is configured to call an open graphics library based on the profile, wherein the open graphics library includes a plurality of reference functions; and call a reference function provided by the open graphics library in the reference order, and execute the called reference function.

In summary, in the embodiment of the present disclosure, a reference material is acquired based on the profile, and the reference material is replaced with a target material uploaded by a user. An animated special effect is recovered from the replaced reference material based on the profile, such that a target video is obtained. It can be seen that in the present disclosure, a target video having an animated special effect is generated based on a target material uploaded by a user. The user only needs to upload a target material to obtain the target video with the animated special effect, without the need to add the animated special effect manually. Therefore, the operation procedure is simplified, the difficulty of making videos is lowered, the user's passion in making videos is increased, and the user experience is enhanced.

With regard to the device in the above embodiments, the way in which the respective modules perform the operations has been described in detail in embodiments of the method, and is not explained in detail herein.

It should be noted that the apparatus according to the above embodiments is only illustrated by example of functional modules as the above-mentioned. While in practice, the above functions may be performed by different modules as desired, that is, the internal structure of the device may be divided into different functional modules, so as to achieve all or a part of the functions described above.

Figure 6:
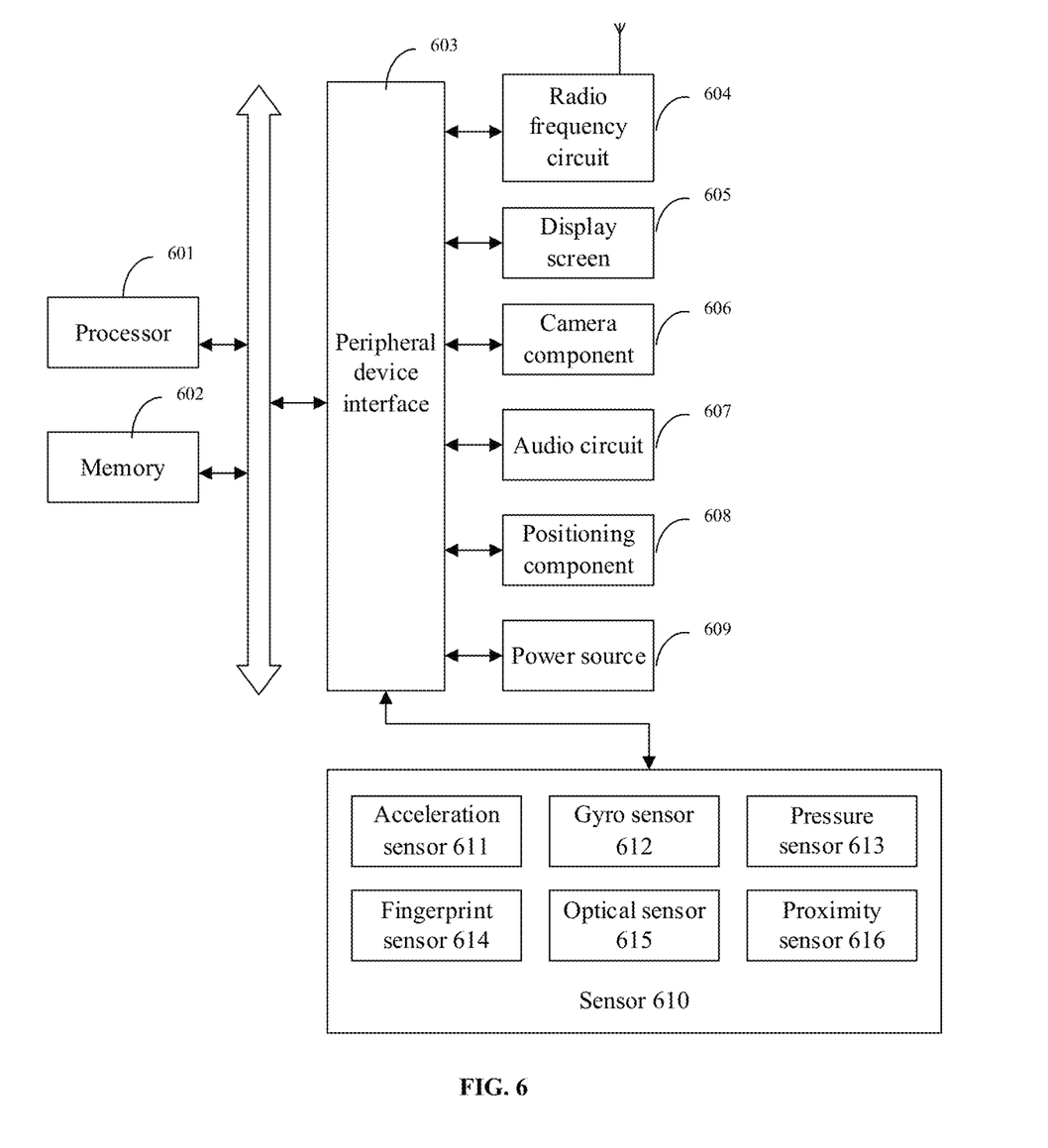
FIG. 6 is a schematic structural diagram of an electronic device according to an example embodiment.

FIG. 6 is a block diagram of an electronic device 600 in accordance with one embodiment of the present disclosure. The electronic device 600 may be such a portable mobile display device as a smart phone, a tablet PC, a Moving Picture Experts Group Audio Layer III (MP3) player, a Moving Picture Experts Group Audio Layer IV (MP4) player, a laptop or a desk computer. The electronic device 600 may also be called a user equipment (UE), a portable display device, a laptop display device, a desktop display device, or the like.

Generally, the electronic device 600 includes a processor 601 and a memory 602.

The processor 601 may include one or more processing cores, such as a 4-core processor and an 8-core processor. The processor 601 may be formed by at least one hardware of a digital signal processor (DSP), a field-programmable gate array (FPGA), and a programmable logic array (PLA). The processor 601 may also include a main processor and a coprocessor. The main processor is a processor for processing the data in an awake state, and is also called a central processing unit (CPU). The coprocessor is a low-power-consumption processor for processing the data in a standby state. In some embodiments, the processor 601 may be integrated with a graphics processing unit (GPU), which is configured to render and draw the content that needs to be displayed by a display screen. In some embodiments, the processor 601 may also include an Artificial Intelligence (AI) processor configured to process computational operations related to machine learning.

The memory 602 may include one or more computer-readable storage mediums, which can be non-transitory. The memory 602 may also include a high-speed random access memory, as well as a non-volatile memory, such as one or more disk storage devices and flash storage devices. In some embodiments, the non-transitory computer-readable storage medium in the memory 602 is configured to store at least one instruction. The at least one instruction is configured to be executed by the processor 601 to perform the methods for generating the video according to the embodiments of the present disclosure.

In some embodiments, the electronic device 600 also optionally includes a peripheral device interface 603 and at least one peripheral device. The processor 601, the memory 602, and the peripheral device interface 603 may be connected by a bus or a signal line. Each peripheral device may be connected to the peripheral device interface 603 by a bus, a signal line, or a circuit board. For example, the peripheral device includes at least one of a radio frequency circuit 604, a display panel 605, a camera component 606, an audio circuit 607, a positioning component 608 and a power source 609.

The peripheral device interface 603 may be configured to connect at least one peripheral device associated with an I/O (Input/Output) to the processor 601 and the memory 602. In some embodiments, the processor 601, the memory 602 and the peripheral device interface 603 are integrated on the same chip or circuit board. In some other embodiments, any one or two of the processor 601, the memory 602 and the peripheral device interface 603 may be implemented on a separate chip or circuit board, which is not limited in this embodiment.

The radio frequency circuit 604 is configured to receive and transmit an RF (Radio Frequency) signal, which is also referred to as an electromagnetic signal. The radio frequency circuit 604 communicates with a communication network and other communication devices via the electromagnetic signal. The radio frequency circuit 604 converts the electrical signal into the electromagnetic signal for transmission, or converts the received electromagnetic signal into the electrical signal.

In some embodiments, the radio frequency circuit 604 includes an antenna system, an RF transceiver, one or more amplifiers, a tuner, an oscillator, a digital signal processor, a codec chipset, a subscriber identity module card, and the like. The radio frequency circuit 604 can communicate with other display devices via at least one wireless communication protocol. The wireless communication protocol includes, but not limited to, the World Wide Web, a metropolitan area network, an intranet, various generations of mobile communication networks (2G, 3G, 4G, and 5G), a wireless local area network, and/or a wireless fidelity (Wi-Fi) network. In some embodiments, the RF circuit 604 may also include near field communication (NFC) related circuits, which is not limited in the present disclosure.

The display panel 605 is configured to display a user interface (UI). The UI may include graphics, text, icons, videos, and any combination thereof. When the display panel 605 is a touch display screen, the display panel 605 also has the capacity to acquire touch signals on or over the surface of the display panel 605. The touch signal may be input into the processor 601 as a control signal for processing. At this time, the display panel 605 may also be configured to provide virtual buttons and/or virtual keyboards, which are also referred to as soft buttons and/or soft keyboards. In some embodiments, one display panel 605 may be disposed on the front panel of the electronic device 600. In some other embodiments, at least two display panels 605 may be disposed respectively on different surfaces of the electronic device 600 or in a folded design. The display panel 605 may be a liquid crystal display (LCD) panel, an organic light-emitting diode (OLED) panel or the like.

The camera component 606 is configured to capture images or videos. In some embodiments of the present disclosure, the camera component 606 includes a front camera and a rear camera. Usually, the front camera is placed on the front panel of the display device, and the rear camera is placed on the back of the display device. In some embodiments, at least two rear cameras are disposed, and are at least one of a main camera, a depth-of-field camera, a wide-angle camera, and a telephoto camera respectively, so as to implement a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 606 may also include a flashlight. The flashlight may be a mono-color temperature flashlight or a two-color temperature flashlight. The two-color temperature flash is a combination of a warm flashlight and a cold flashlight and can be used for light compensation at different color temperatures.

The audio circuit 607 may include a microphone and a speaker. The microphone is configured to collect sound waves of users and environments, and convert the sound waves into electrical signals which are input into the processor 601 for processing, or input into the RF circuit 604 for voice communication. For the purpose of stereo acquisition or noise reduction, there may be a plurality of microphones respectively disposed at different locations of the electronic device 600. The microphone may also be an array microphone or an omnidirectional acquisition microphone. The speaker is then configured to convert the electrical signals from the processor 601 or the radio frequency circuit 604 into the sound waves. The speaker may be a film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 607 may also include a headphone jack.

The positioning component 608 is configured to locate the current geographic location of the electronic device 600 to implement navigations or location based services (LBS). The positioning assembly 808 may be the global positioning system (GPS) from the United States, the Beidou positioning system from China, the Grenas satellite positioning system from Russia or the Galileo satellite navigation system from the European Union.

The power source 609 is configured to power up various components in the electronic device 600. The power source 609 may be alternating current, direct current, a disposable battery, or a rechargeable battery. When the power source 609 includes the rechargeable battery, the rechargeable battery may support wired or wireless charging. The rechargeable battery may also support the fast charging technology.

In some embodiments, the electronic device 600 also includes one or more sensors 610. The one or more sensors 610 include, but not limited to, an acceleration sensor 611, a gyro sensor 612, a pressure sensor 613, a fingerprint sensor 614, an optical sensor 615 and a proximity sensor 616.

The acceleration sensor 611 may detect magnitudes of accelerations on three coordinate axes of a coordinate system established by the electronic device 600. For example, the acceleration sensor 611 may be configured to detect components of a gravitational acceleration on the three coordinate axes. The processor 601 may control the touch display panel 605 to display a user interface in a landscape view or a portrait view based on a gravity acceleration signal collected by the acceleration sensor 611. The acceleration sensor 611 may also be configured to collect motion data of a game or a user.

The gyro sensor 612 can detect a body direction and a rotation angle of the electronic device 600, and can cooperate with the acceleration sensor 611 to collect a 3D motion of the user on the electronic device 600. Based on the data collected by the gyro sensor 612, the processor 601 can serve the following functions: motion sensing (such as changing the UI based on a user's tilt operation), image stabilization during shooting, game control and inertial navigation.

The pressure sensor 613 may be disposed on a side frame of the electronic device 600 and/or a lower layer of the touch display panel 605. When the pressure sensor 613 is disposed on the side frame of the electronic device 600, a user's holding signal to the electronic device 600 can be detected. The processor 601 can perform left-right hand recognition or quick operation based on the holding signal collected by the pressure sensor 613. When the pressure sensor 613 is disposed on the lower layer of the touch display panel 605, the processor 601 controls an operable control on the UI based on a user's pressure operation on the touch display panel 605. The operable control includes at least one of a button control, a scroll bar control, an icon control and a menu control.

The fingerprint sensor 614 is configured to collect a user's fingerprint. The processor 601 identifies the user's identity based on the fingerprint collected by the fingerprint sensor 614, or the fingerprint sensor 614 identifies the user's identity based on the collected fingerprint. When the user's identity is identified as trusted, the processor 601 authorizes the user to perform related sensitive operations, such as unlocking the screen, viewing encrypted information, downloading software, paying, and changing settings. The fingerprint sensor 614 may be provided on the front, back, or side of the electronic device 600. When the electronic device 600 is provided with a physical button or a manufacturer's Logo, the fingerprint sensor 614 may be integrated with the physical button or the manufacturer's Logo.

The optical sensor 615 is configured to collect ambient light intensity. In one embodiment, the processor 601 may control the display brightness of the touch display panel 605 based on the ambient light intensity collected by the optical sensor 615. For example, when the ambient light intensity is high, the display brightness of the touch display panel 605 is increased; and when the ambient light intensity is low, the display brightness of the touch display panel 605 is decreased. In another embodiment, the processor 601 may also dynamically adjust shooting parameters of the camera component 606 based on the ambient light intensity collected by the optical sensor 615.

The proximity sensor 616, also referred to as a distance sensor, is usually disposed on the front panel of the electronic device 600. The proximity sensor 616 is configured to capture a distance between the user and a front surface of the electronic device 600. In one embodiment, when the proximity sensor 616 detects that the distance between the user and the front surface of the electronic device 600 becomes gradually smaller, the processor 601 controls the touch display panel 605 to switch from a screen-on state to a screen-off state. When it is detected that the distance between the user and the front surface of the electronic device 600 gradually increases, the processor 601 controls the touch display panel 605 to switch from the screen-off state to the screen-on state.

It will be understood by those skilled in the art that the structure shown in FIG. 6 does not constitute a limitation to the electronic device 600, and may include more or less components than those illustrated, or combine some components or adopt different component arrangements.

An embodiment of the present disclosure further provides an electronic device. The electronic device includes a processor and a memory configured to store at least one instruction executable by the processor; wherein the processor is configured to load and execute the at least one instruction stored in the memory to perform the steps of:

acquiring a profile of a video template, the profile being configured to describe one or more reference materials of the video template and an animated special effect corresponding to each of the one or more reference materials;

acquiring the one or more reference materials based on the profile;

acquiring a target material;

acquiring at least one replaced reference material by replacing at least one of the one or more reference materials with the target material; and generating a target video with the animated special effect by rendering the replaced reference material based on the profile.

In some embodiments, the processor is configured to execute the at least one instruction to perform the steps of:

acquiring a predetermined display duration of each of the at least one replaced reference material; and generating the target video with the animated special effect by rendering the replaced reference material based on the profile and the display duration of each replaced reference material, wherein any of the at least one replaced reference material in the target video is displayed based on the display duration of the any replaced reference material.

In some embodiments, the processor is configured to execute the at least one instruction to perform the step of:

rendering the replaced reference material in a reference order based on the profile.

In some embodiments, each of the at least one replaced reference material corresponds to a time point in a timeline of the video template, and the processor is configured to execute the at least one instruction to perform the step of:

determining the reference order based on an order of time points.

In some embodiments, the processor is configured to execute the at least one instruction to perform the steps of:

calling an open graphics library based on the profile, the open graphics library including a plurality of reference functions; and calling a reference function provided by the open graphics library in the reference order, and executing the called reference function.

An embodiment of the present disclosure further provides a non-temporary computer-readable storage medium storing at least one instruction therein. The at least one instruction, when executed by a processor of an electronic device, enables the electronic device to perform the steps of:

acquiring a profile of a video template, the profile being configured to describe one or more reference materials of the video template and an animated special effect corresponding to each of the one or more reference materials;

acquiring the one or more reference materials based on the profile;

acquiring a target material;

acquiring at least one replaced reference material by replacing at least one of the one or more reference materials with the target material; and generating a target video with the animated special effect by rendering the replaced reference material based on the profile.

In some embodiments, the at least one instruction, when executed by the processor of the electronic device, enables the electronic device to perform the steps of:

acquiring a predetermined display duration of each of the at least one replaced reference material; and generating the target video with the animated special effect by rendering the replaced reference material based on the profile and the display duration of each of the at least one replaced reference material, wherein any of the at least one replaced reference material in the target video is displayed based on the display duration of the any replaced reference material.

In some embodiments, the at least one instruction, when executed by the processor of the electronic device, enables the electronic device to perform the step of: rendering the replaced reference material in a reference order based on the profile.

In some embodiments, each of the at least one replaced reference material corresponds to a time point in a timeline of the video template, and the at least one instruction, when executed by the processor of the electronic device, enables the electronic device to perform the step of: determining the reference order based on an order of time points.

In some embodiments, the at least one instruction, when executed by the processor of the electronic device, enables the electronic device to perform the steps of:

calling an open graphics library based on the profile, the open graphics library including a plurality of reference functions; and calling a reference function provided by the open graphics library in the reference order, and executing the called reference function.

An embodiment of the present disclosure further provides a computer program product including at least one, wherein the at least one instruction, when executed by a processor of an electronic device, enables the electronic device to perform the steps of:

acquiring a profile of a video template, the profile being configured to describe one or more reference materials of the video template and an animated special effect corresponding to each of the one or more reference material;

acquiring the one or more reference materials based on the profile;

acquiring a target material;

acquiring at least one replaced reference materials by replacing at least one of the one or more reference materials with the target material; and generating a target video with the animated special effect by rendering the replaced reference material based on the profile.

In some embodiments, the at least one instruction, when executed by a processor of an electronic device, enables the electronic device to perform the steps of:

acquiring a predetermined display duration of each of the at least one replaced reference material; and generating the target video with the animated special effect by rendering the replaced reference material based on the profile and the display duration of each of the at least one replaced reference material, wherein any of the at least one replaced reference material in the target video is displayed based on the display duration of the any replaced reference material.

In some embodiments, the at least one instruction, when executed by a processor of an electronic device, enables the electronic device to perform the step of: rendering the replaced reference material in a reference order based on the profile.

In some embodiments, each of the at least one replaced reference material corresponds to a time point in a timeline of the video template, and the at least one instruction, when executed by a processor of an electronic device, enables the electronic device to perform the step of: determining the reference order based on an order of time points.

In some embodiments, the at least one instruction, when executed by a processor of an electronic device, enables the electronic device to perform the steps of:

calling an open graphics library based on the profile, the open graphics library including a plurality of reference functions; and calling a reference function provided by the open graphics library in the reference order, and executing the called reference function.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as example only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be defined by the appended claims.

What is claimed is:

1. A method for generating a video, comprising:
   acquiring a profile of a video template, the profile being configured to describe one or more reference materials of the video template and an animated special effect corresponding to each of the one or more reference materials;
   acquiring the one or more reference materials based on the profile;
   displaying names of the respective animated special effects corresponding to each of the one or more reference materials;
   acquiring a target material;
   acquiring at least one replaced reference material by replacing at least one of the one or more reference materials with the target material; and
   generating a target video with the animated special effect by rendering the replaced reference material based on the profile,
   wherein the animated special effect corresponding to the replaced reference material is consistent with the animated special effect corresponding to the reference material before being replaced, and the animated special effect refers to transformation processes and display effects of the one or more reference materials,
   wherein the profile describes each of one or more reference materials by code data or a path, the code data is configured to describe pattern composed of one or more graphics included in the reference material, and the path is configured to describe addresses of image and video included in the reference material, the code data is further configured to describe the animated special effect corresponding to the reference material, the code data or the path configured to describe the reference material is stored corresponding to the code data configured to describe the animated special effect of the reference material.

2. The method according to claim 1, further comprising:
acquiring a predetermined display duration of each of the at least one replaced reference material;
wherein generating the target video with the animated special effect by rendering the replaced reference material based on the profile comprises:
generating the target video with the animated special effect by rendering the replaced reference material based on the profile and the display duration of each of the at least one replaced reference material, wherein any of the at least one replaced reference material in the target video is displayed based on the display duration of the any replaced reference material.

3. The method according to claim 1, wherein rendering the replaced reference material based on the profile comprises:
rendering the replaced reference material in a reference order based on the profile.

4. The method according to claim 3, wherein each of the at least one replaced reference material corresponds to a time point in a timeline of the video template, and before rendering the replaced reference material in the reference order, the method further comprises:
determining the reference order based on an order of time points.

5. The method according to claim 3, wherein rendering the replaced reference material in the reference order based on the profile comprises:
calling an open graphics library based on the profile, the open graphics library comprising a plurality of reference functions;
calling a reference function provided by the open graphics library in the reference order; and
executing the called reference function to restore the animated special effect on the replaced reference material.

6. The method according to claim 1, wherein the profile of the video template is acquired by calling a plugin to export the video template as the profile of the video template, wherein the plugin is bodymovin.

7. An electronic device comprising:
a processor; and
a memory configured to store at least one instruction executable by the processor,
wherein the at least one instruction, when executed by the processor, causes the processor to perform a method comprising:
acquiring a profile of a video template, the profile being configured to describe one or more reference materials of the video template and an animated special effect corresponding to each of the one or more reference materials;
acquiring the one or more reference materials based on the profile;
displaying names of the respective animated special effects corresponding to each of the one or more reference materials;
acquiring a target material;
acquiring at least one replaced reference material by replacing at least one of the one or more reference materials with the target material; and
rendering the replaced reference material based on the profile to generate a target video with the animated special effect,
wherein the animated special effect corresponding to the replaced reference material is consistent with the animated special effect corresponding to the reference material before being replaced, and the animated special effect refers to transformation processes and display effects of the one or more reference materials,
wherein the profile describes each of one or more reference materials by code data or a path, the code data is configured to describe pattern composed of one or more graphics included in the reference material, and the path is configured to describe addresses of image and video included in the reference material, the code data is further configured to describe the animated special effect corresponding to the reference material, the code data or the path configured to describe the reference material is stored corresponding to the code data configured to describe the animated special effect of the reference material.

8. The electronic device according to claim 7, wherein the method further comprises:
acquiring a predetermined display duration of each of the at least one replaced reference material; and
generating the target video with the animated special effect by rendering the replaced reference material based on the profile and the display duration of each of the at least one replaced reference material, wherein any of the at least one replaced reference material in the target video is displayed based on the display duration of the any replaced reference material.

9. The electronic device according to claim 7, wherein the method further comprises:
rendering the replaced reference material in a reference order based on the profile.

10. The electronic device according to claim 9, wherein each of the at least one replaced reference material corresponds to a time point in a timeline of the video template, and
wherein the method further comprises:
determining the reference order based on an order of time points.

11. The electronic device according to claim 9, wherein the method further comprises:
calling an open graphics library based on the profile, the open graphics library comprising a plurality of reference functions;
calling a reference function provided by the open graphics library in the reference order; and
executing the called reference function to restore the animated special effect on the replaced reference material.

12. A non-transitory storage medium storing at least one instruction therein, wherein the at least one instruction, when executed by a processor of an electronic device, causes the processor to perform a method comprising:
acquiring a profile of a video template, the profile being configured to describe one or more reference materials of the video template and an animated special effect corresponding to each of the one or more reference materials;
acquiring the one or more reference materials based on the profile;

displaying names of the respective animated special effects corresponding to each of the one or more reference materials;

acquiring a target material;

acquiring at least one replaced reference material by replacing at least one of the one or more reference materials with the target material; and rendering the replaced reference material according to the profile to generate a target video with the animated special effect, wherein the animated special effect corresponding to the replaced reference material is consistent with the animated special effect corresponding to the reference material before being replaced, and the animated special effect refers to transformation processes and display effects of the one or more reference materials, wherein the profile describes each of one or more reference materials by code data or a path, the code data is configured to describe pattern composed of one or more graphics included in the reference material, and the path is configured to describe addresses of image and video included in the reference material, the code data is further configured to describe the animated special effect corresponding to the reference material, the code data or the path configured to describe the reference material is stored corresponding to the code data configured to describe the animated special effect of the reference material.

13. The non-transitory storage medium according to claim 12, wherein the method further comprises:

acquiring a predetermined display duration of each of the at least one replaced reference material; and generating the target video with the animated special effect by rendering the replaced reference material based on the profile and the display duration of each of the at least one replaced reference material, wherein any of the at least one replaced reference material in the target video is displayed based on the display duration of the any replaced reference material.

14. The non-transitory storage medium according to claim 12, wherein the method further comprises:

rendering the replaced reference material in a reference order based on the profile.

15. The non-transitory storage medium according to claim 14, wherein each of the at least one replaced reference material corresponds to a time point in a timeline of the video template, and wherein the method further comprises:

determining the reference order based on an order of time points.

16. The non-transitory storage medium according to claim 14, wherein the method further comprises:

calling an open graphics library based on the profile, the open graphics library comprising a plurality of reference functions;

calling a reference function provided by the open graphics library in the reference order; and executing the called reference function to restore the animated special effect on the replaced reference material.

* * * * *